United States Patent [19]

Holly

[11] Patent Number: 4,594,673

[45] Date of Patent: Jun. 10, 1986

[54] HIDDEN SURFACE PROCESSOR

[75] Inventor: James R. Holly, San Diego, Calif.

[73] Assignee: GTI Corporation, San Diego, Calif.

[21] Appl. No.: 509,152

[22] Filed: Jun. 28, 1983

[51] Int. Cl.$^4$ .............................................. G06F 3/14
[52] U.S. Cl. ................................ 364/522; 340/729; 340/734; 364/521
[58] Field of Search .............. 364/521, 522, 478; 340/711, 720, 729, 734, 723, 724; 358/903

[56] References Cited

U.S. PATENT DOCUMENTS

| | | | |
|---|---|---|---|
| 3,665,408 | 5/1972 | Erdahl et al. | 340/729 |
| 4,396,989 | 8/1983 | Fleming et al. | 364/521 |
| 4,475,104 | 10/1984 | Shen | 364/521 |
| 4,509,043 | 4/1985 | Mossaides | 340/729 |

Primary Examiner—Errol A. Krass
Assistant Examiner—Heather R. Herndon
Attorney, Agent, or Firm—Morland C. Fischer

[57] ABSTRACT

A high speed hidden surface processor capable of operating in real time and suitable for interaction with a computer-generated imagery or computer graphics system, whereby a realistic three-dimensional scene can be projected on a two-dimensional video display. The scene is formed by one or more polygons that are visible from an arbitrary viewpoint. The present hidden surface processor employs a hidden surface algorithm, such that certain polygons or portions of polygons, which polygons are obscured by other polygons lying closer to the viewpoint, are removed or truncated. Ordered linked lists of scan line data corresponding to the surfaces of the visible polygons are assembled and stored, so that the complete scene may be subsequently displayed with increased speed and minimized hardware implementation costs.

20 Claims, 10 Drawing Figures

HIDDEN SURFACE PROCESSOR

BACKGROUND OF THE INVENTION

1. Field of the Invention

This invention relates to a high speed hidden surface processor which employs a hidden surface algoritm to distinguish the hidden and visible surfaces of a three-dimensional solid object relative to an arbitrary viewpoint. The present hidden surface processor has particular application to a computer graphics system by which a realistic two-dimensional representation of the object can be projected on a video display.

2. Prior Art

Computer graphics or computer-generated imagery systems are presently available to project realistic, three-dimensional pictures of a solid object on a video display. More particularly, computer graphics systems are known which are capable of displaying full color perspective views of objects and scenes, so that a realistic image or scene may be accurately portrayed. Such computer graphics systems are especially adapted for any of several different applications including, but not limited to, flight simulation techniques, computer aided design, architectural planning, and mathematical modeling. As will be known to those skilled in the art, conventional computer-generated imagery or graphics systems are capable of displaying pictures of three dimensional objects, which objects are typically defined by a plurality of mathematical elements, such as polygons, surface patches, and other higher order surfaces. That is, stored computer data is used to generate an array of scan lines, one scan line at a time, with a particular array of such scan lines defining a polygon, or the like. More particularly, each scan line has a length of several pixels which, when displayed, may represent portions of one or more polygons. The alignment of pluralities of successive scan lines forms a picture to be displayed.

However, to accurately display a realistic three-dimensional image or scene, it is essential to identify the polygon segments which are located closest to a viewpoint. In a realistic setting, certain objects may be either totally or partially obstructed by forward-lying, other objects. In order for three-dimensional objects in a scene to be projected on a two-dimensional video screen, a computer graphics system must have means by which to distinguish the relative positions of the objects, so as not to display any object or portion thereof which would be hidden when observed from the viewpoint. Accordingly, the visible surfaces of a scene which are located in closest proximity to the viewpont must be identified in order that only those scan line segments which are representative of such visible surfaces will be displayed across the video screen.

Processors which define (and remove or truncate) hidden surfaces are commercially known. However, such processors are commonly characterized by one or more of the following shortcomings. More particularly, many processors are not capable of high speed operation, such as, for example, at rates approaching real time, where at least 30 picture frames per second must be generated. Moreover, other processors are fabricated from an arrangement of hardware components and microelectronic devices which have proven relatively costly to implement and difficult to use, especially when vast amounts of video data is to be generated at a rate approaching real time. What is more, still other processors are controlled by a relatively complex hidden surface algorithm which has minimized efficiency and increased throughput delay in the computer graphics system with which the hidden surface processor is interfaced.

Examples of apparatus which have the capability of distinguishing the hidden and visible surfaces of a solid object, so that a realistic three-dimensional representation of the object can be displayed on a video screen are available by referring to one or more of the following U.S. Patents:

| U.S. Pat. No. | Publication Date |
| --- | --- |
| 3,602,702 | August 31, 1971 |
| 3,621,214 | November 16, 1971 |
| 3,665,408 | May 23, 1972 |
| 3,736,564 | May 29, 1973 |
| 3,944,997 | March 16, 1976 |

SUMMARY OF THE INVENTION

It is a primary object of the present invention to provide a hidden surface processor capable of high speed, real time operation for distinguishing the hidden and visible surfaces of a solid, three-dimensional object.

It is another object of this invention that the hidden surface processor be interfaced with a computer graphics or computer-generated imagery system so that a realistic, two-dimensional representation of the object can be projected on a video display.

It is yet another object of this invention that the hidden surface processor be controlled by a relatively simple but efficient hidden surface algorithm by which to minimize the inherent time delay for projecting a representation of the object on the video display.

It is still another object of this invention that the hidden surface processor be implemented by an efficient and compact arrangement of high speed hardware so as to minimize cost and conserve space.

It is a further object of this invention that the hidden surface processor interact with a linked list search processor, so that scan line data regarding the visible portions of a polygon can be assembled and stored in a plurality of ordered lists, such that the data can be rapidly accessed and displayed.

Further objects and advantages of the invention will become apparent as the following description proceeds and the features of novelty which characterize this invention are pointed out with particularity in the claims annexed hereto.

DESCRIPTION OF THE PREFERRED EMBODIMENT

Figure 1:
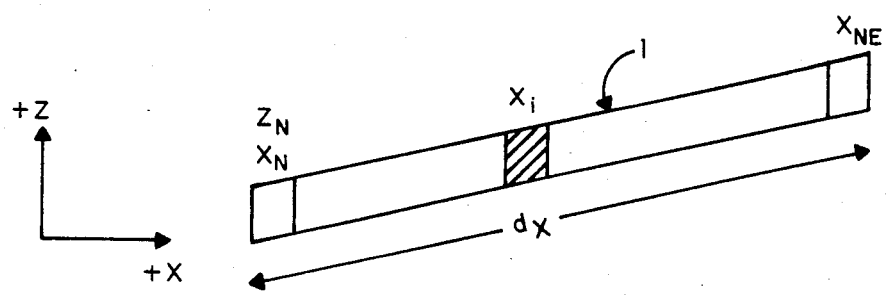
FIG. 1 is representative of a scan line segment containing certain information regarding the location of the segment in three-dimensional space relative to a viewpoint.

Referring to FIG. 1 of the drawings, a segment 1 of a scan line is illustrated having a length and orientation in the X and Z directions, respectively. Each polygon is typically formed by a plurality of such scan line segments. Each scan line segments is comprised of a series of picture elements (pixels). In order to determine whether any portion of scan line segment 1 is obscured by another scan line segment which is located relatively forward of segment 1 and closer to a viewpoint, certain initial parameters regarding scan line segment 1 must be known and available for subsequent computations. More particularly, one such parameter which must be known is the starting coordinate ($X_N$) of the initial pixel that forms segment 1. Similarly, and also required, is the ending coordinate (designated $X_{NE}$) of the final pixel that forms segment 1. Thus, the length (designated dX) of scan segment 1 is the difference between the first and last pixels (i.e. $X_{NE}-X_N$) of the segment plus the length of the first pixel. In order to determine the relative position of scan line segment 1 relative to another scan line segment, knowledge of the distance (designated $Z_N$) of the initial pixel to the viewpoint is also needed. As will be apparent, the greater the magnitude of the distance $Z_N$, the farther away is scan line segment 1 from the viewpoint. Correspondingly, information (designated $dZdX_N$) is needed regarding the change in dimension in segment 1 in the Z direction for a change in dimension in the X direction. The precise distance to the viewpoint of any arbitrary pixel (designated $X_i$) along segment 1 can be determined by performing the calculation:

$$Z_N+(X_i-X_N)\cdot(dZdX_N).$$

Lastly, the polygon number is required so that the information provided by the scan line segment 1 can be applied to the formation of a corresponding polygon.

Examples will be presented below of a method in which information regarding certain portions of one or more scan line segments is collected and assembled in an ordered list of data, so that a complete scan line (indicative of the contents of the list) can be projected on a video display, which scan line represents portions of one or more polygons which will be visible from the viewpoint.

The ordered list referred to herein is known in the art as a linked list. Data items containing information regarding the segments which form a scan line are encoded and stored in the linked list according to the respective magnitudes of the scan line segment starting coordinates. A search processor which is suitable to interact with the presently disclosed hidden surface processor to store the linked list of data is disclosed in detail in application Ser. No. 483,545 filed Apr. 11, 1983, the details of which application are incorporated herein by reference. In general terms, the linked list search processor referred to above is adapted to read new data entries to the linked list regarding the segments of a scan line and to selectively insert each of the new data entries at a particular location in the list according to the magnitude of the scan line segment starting coordinate thereof. Thus, when a new data item is read, the linked list search processor is capable of identifying the address of an existing data item in the list having the largest scan line segment starting coordinate ($X_L$), such that $X_N>X_L$, where $X_N$, as previously disclosed, is the magnitude of the scan line segment starting coordinate of the new data entry to be added to the linked list.

Figure 2:
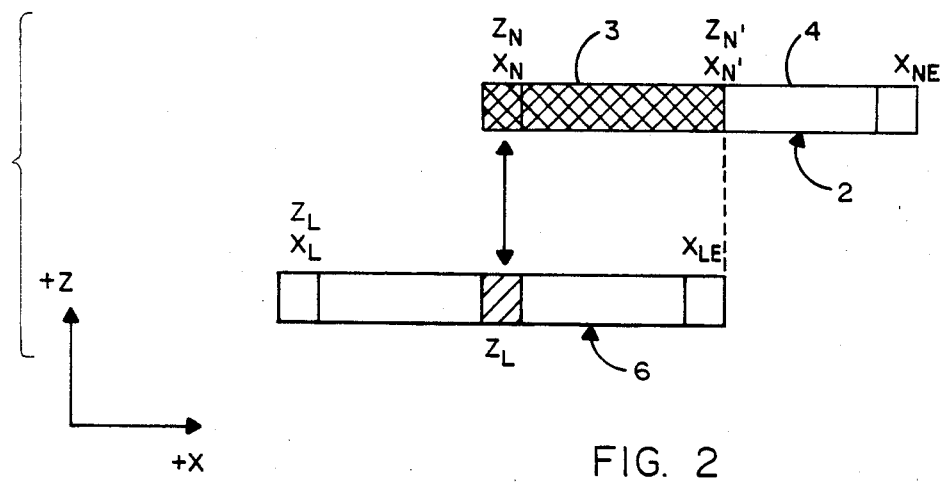
FIGS. 2, 3 and 4 are illustrative of examples of the method by which the present hidden surface processor distinguishes between the hidden and visible surfaces of a pair of scan line segments which form portions of respective polygons.

A first example of the method of operation of the present hidden surface processor is described while referring to FIG. 2 of the drawings. A scan line segment 2 contains new information to be added to the linked list of data entries already stored in the linked list search processor. The linked list search processor receives a coded indication of the starting coordinate $X_N$ of the new scan segment 2. The search processor conducts a search of the entries stored in the list, so as to locate the largest starting coordinate $X_L$ of an existing scan line segment 6, such that $X_N>X_L$. Accordingly, a calculation is made to determine which portion, if any, of the new scan line segment 2 will be visible from the viewpoint, depending upon the locations of the scan segments 2 and 6 relative to one another, in the X and Z directions.

More particularly, the ending coordinate ($X_{LE}$) of the existing scan line segment 6 is less than the ending coordinate ($X_{NE}$) of the new scan line segment 2. Hence, a calculation of $Z_L$ at $X_N$ is made to determine the distance of existing scan line segment 6 from the viewpoint at a location in the X direction corresponding to the starting coordinate of new scan line segment 2. As disclosed hereinabove, the aforementioned calculation is computed as follows:

$$Z_L \text{ at } X_N=Z_L+(X_N-X_L)\cdot(dZdX_L).$$

As previously indicated, the magnitude of the parameter $Z_N$ is known initially. Thus, a comparison is made between the respective magnitudes of $Z_N$ and $Z_L$ calculated at $X_N$. In the present example, $Z_N>Z_L$ at $X_N$, so as to provide an indication that new scan line segment 2 is behind and at least partially obscured by existing scan line segment 6. In order to determine whether all or only a part of new scan line segment 2 will be hidden relative to the viewpoint, a comparison is made between the magnitudes $X_{LE}$ and $X_{NE}$ of the respective ending coordinates of segments 6 and 2. In the present example, the ending coordinate $X_{NE}$ of new scan line segment 2 is larger than the ending coordinate $X_{LE}$ of existing scan line segment 6, so as to indicate that only a portion 3 of segment 2 will be obscured and hidden relative to the viewpoint.

Accordingly, the portion 3 (represented by cross hatching) of scan line segment 2 having a length in the X direction less than the end of scan line segment 6 is truncated (inasmuch as said surface length will not be visible at the viewing point). The truncated end of the visible portion 4 of scan line segment 2 is provided with appropriately changed coordinates, designated $X_N'$ and $Z_N'$, in the X and Z directions, respectively. The hidden surface processor is now ready to compare information regarding the scan line segment (not shown) stored in the linked list after the existing scan line segment 6 with the information obtained regarding new scan line segment 2, so as to determine if any information corresponding to the inclusion of the visible surface added by new scan line segment 2 must be altered as a consequence of the scan line segment next listed in the linked list after segment 6. Such a comparison of information is described in greater detail hereinafter when referring to the example in FIG. 4 of the drawings.

Figure 3:
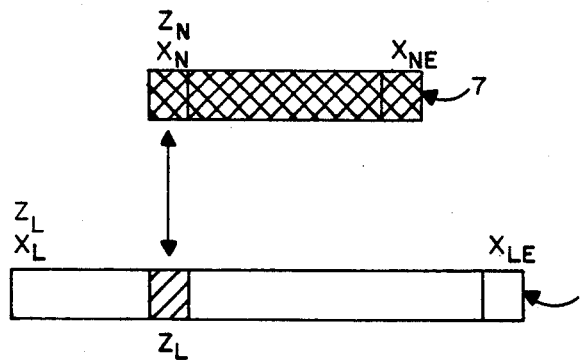

A second example of the method of operation of the present hidden surface processor is described while referring to FIG. 3 of the drawings. Scan line segment 7 is a new segment which contains information to be added to the list of data entries stored in the linked list search processor. As indicated in the first example of FIG. 2, the linked list search processor receives a coded indication of the starting coordinate $X_N$ of the new scan line segment 7. After a search of the existing elements stored in the linked list, a particular existing scan line segment 8 is located having the largest starting coordinate $X_L$, such that $X_N > X_L$. Accordingly, an investigation is made to determine which portion, if any, of the new scan line segment 7 will be visible from the viewpoint, depending upon the locations of the scan line segments 2 and 6 relative to one another in the X directions.

More particularly, the magnitude of the ending coordinate $X_{LE}$ of the existing scan line segment 8 is compared with and determined to be greater than the magnitude of the ending coordinate $X_{NE}$ of the new scan line segment 7. A calculation of $Z_L$ at $X_N$ is then made to determine the distance of the existing scan line segment 8 from the viewpoint at a location in the X direction corresponding to the starting coordinate of new scan line segment 7. As previously indicated, the magnitude of the parameter $Z_N$ is known initially. Thus, a comparison is made between the respective magnitudes $Z_N$ and $Z_L$ calculated at $X_N$ so as to determine which of scan line segments 7 or 8 is closer to the viewpoint. In the present example, $Z_N > Z_L$ at $X_N$, so as to provide an indication that new scan line segment 7 is behind and (inasmuch as $X_{LE}$ was earlier determined to be greater than $X_{NE}$) totally obscured by existing scan line segment 8.

Accordingly, the entire length (represented by cross-hatching) of scan line segment 7 is ignored, inasmuch as such segment is completely hidden from the viewpoint. Thus, no additional information is inserted into the linked list and the hidden surface processor is ready to process information regarding another new scan line segment to determine the presence of any visible surface length thereof.

Figure 4:
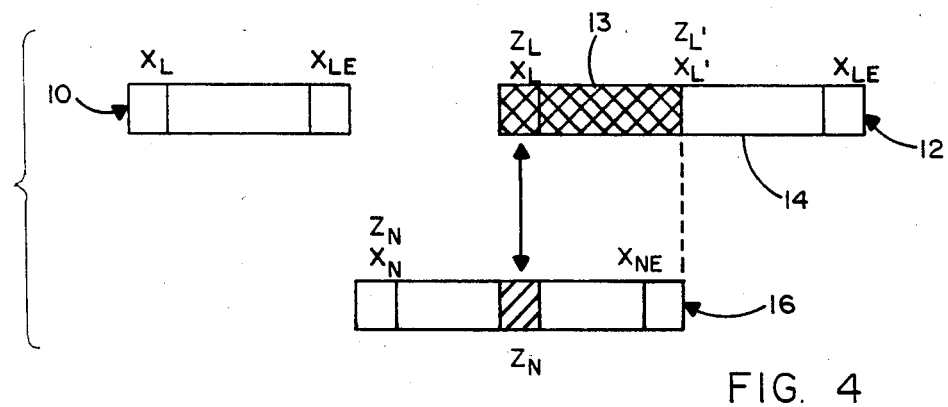

A third example of the operation of the present hidden surface processor is described while referring to FIG. 4 of the drawings. Scan line segment 16 is a new segment which contains information to be added to the list of data entries already stored in the linked list search processor. As indicated in the example of FIGS. 2 and 3, the linked list search processor will return a particular starting coordinate $X_L$ of an existing scan line segment 10 stored in the linked list, where the search argument, $X_N$, is the starting coordinate of new scan line segment 16. As was also indicated, the returned starting coordinate $X_L$ of the existing scan line segment 10 has the largest magnitude of any scan line segment stored in the linked list, such that $X_N > X_L$. However, the magnitude of the ending coordinate $X_{LE}$ of the existing scan line segment 10 is compared with and determined to be less than the magnitude of the starting coordinate $X_N$ of new scan line segment 16. Accordingly, and regardless of the location of new scan line segment 16 in the Z direction, the entire surface thereof will be visible from the viewpoint relative to the location of existing scan line segment 10. However, an investigation is conducted of the next scan line segment 12 stored in the linked list after the location of the initially returned scan line segment 10 so as to determine whether any of the heretofor visible surface of segment 12 will be hidden from the viewpoint as a consequence of the inclusion of the visible surface added by new scan line segment 16. Should it be found that some portion of the next listed scan line segment 12 will not be visible from the viewpoint, then a change will be necessitated in the information stored in the linked list corresponding to segment 12.

More particularly, the magnitude of the ending coordinate $X_{NE}$ of the new scan line segment 16 is greater than the magnitude of the starting coordinate $X_L$, but less than the magnitude of the ending coordinate $X_{LE}$ of the next listed scan line segment 12, so as to provide an indication that a portion 13 of next segment 12 is overlapped in the X direction by some or all of new segment 16. To determine whether portion 13 of next segment 12 is obscured by new segment 16 relative to the viewpoint, a calculation of $Z_N$ at $X_L$ is made to determine the distance of new scan line segment 16 from the viewpoint at a location in the X direction corresponding to the starting coordinate $X_L$ of the next listed scan line segment 12. As disclosed hereinabove, the aforementioned calculation is computed as follows:

$$Z_N \text{ at } X_L = Z_N + (X_L - X_N) \cdot (dZdX_N).$$

Inasmuch as the magnitude of the parameter $Z_L$ is known initially, a comparison is made between the respective magnitudes $Z_L$ and $Z_N$ calculated at $X_L$ so as to determine which of scan line segments 12 or 16 is closer to the viewpoint. In the present example, $Z_N$ at $X_L > Z_L$, so as to provide an indication that the scan line segment 12 stored in the linked list after segment 10 is behind and (inasmuch as $X_{LE}$ was earlier determined to be greater than $X_{NE}$) partially obscured by new scan line segment 16.

Accordingly, the portion 13 (represented by cross-hatching) of scan line segment 12 having a length in the X direction less than the end of scan line segment 16 is truncated and deleted from the information stored in the linked list. The truncated end of the visible portion 14 of next listed scan line segment 12 is provided with appropriately changed coordinates $X_L'$ and $X_L'$ in the X and Z directions, respectively. Moreover, information corresponding to the length of the surface of visible portion 14 is added to the linked list. That is, the information represented by the visible portion 14 of scan line segment 12 is inserted back into the linked list at a particular address depending upon the magnitude of the changed starting coordinate $X_L'$ relative to the starting coordinates of the existing data entries which have been previously stored in the list. What is more, information corresponding to the entire length of the visible surface of new scan line segment 16 is also added to the linked list. The hidden surface processor is now ready to process information regarding another new scan line segment to determine the presence of any visible surface length thereof.

Figure 7:
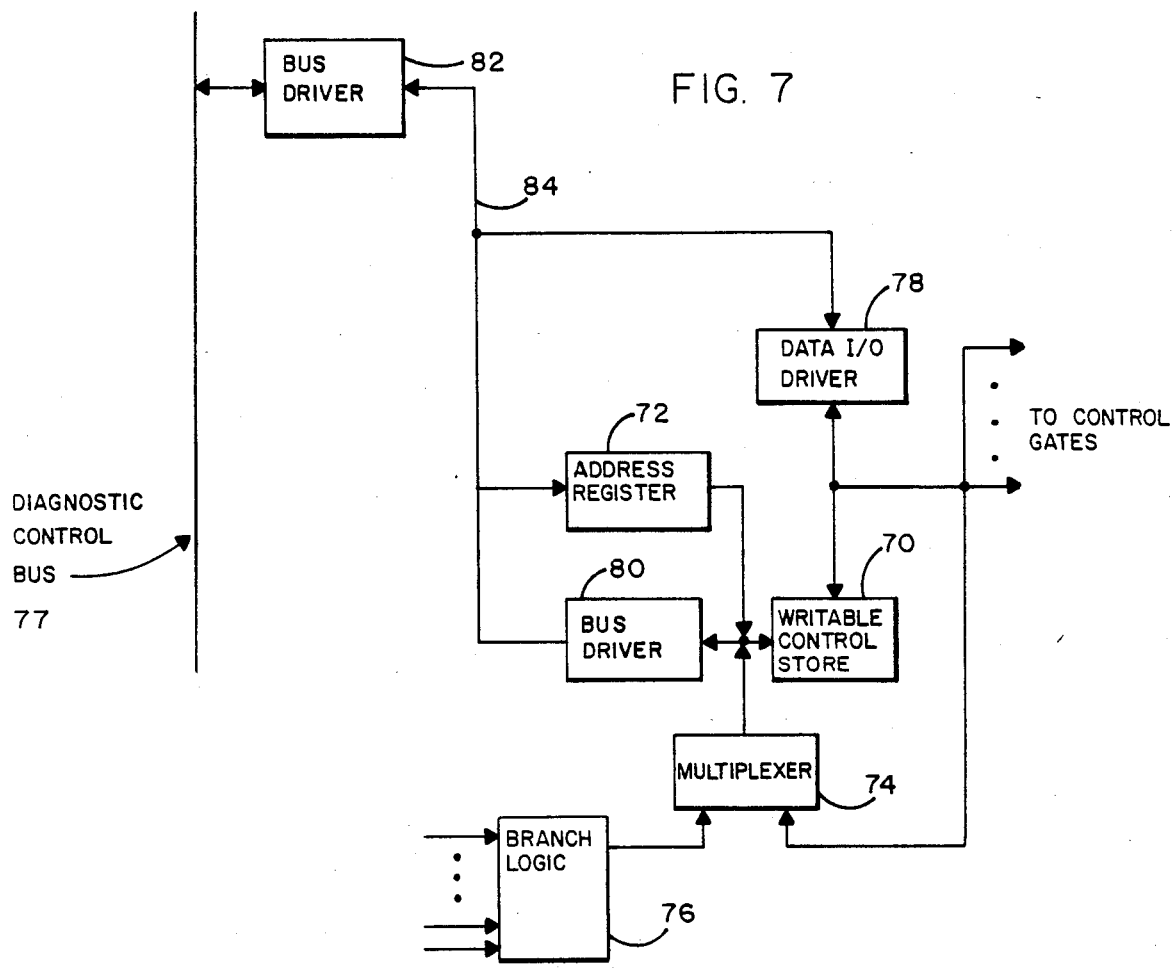
FIG. 7 is a block diagram of diagnostic and control hardware which also forms the present hidden surface processor.
Figure 8A:
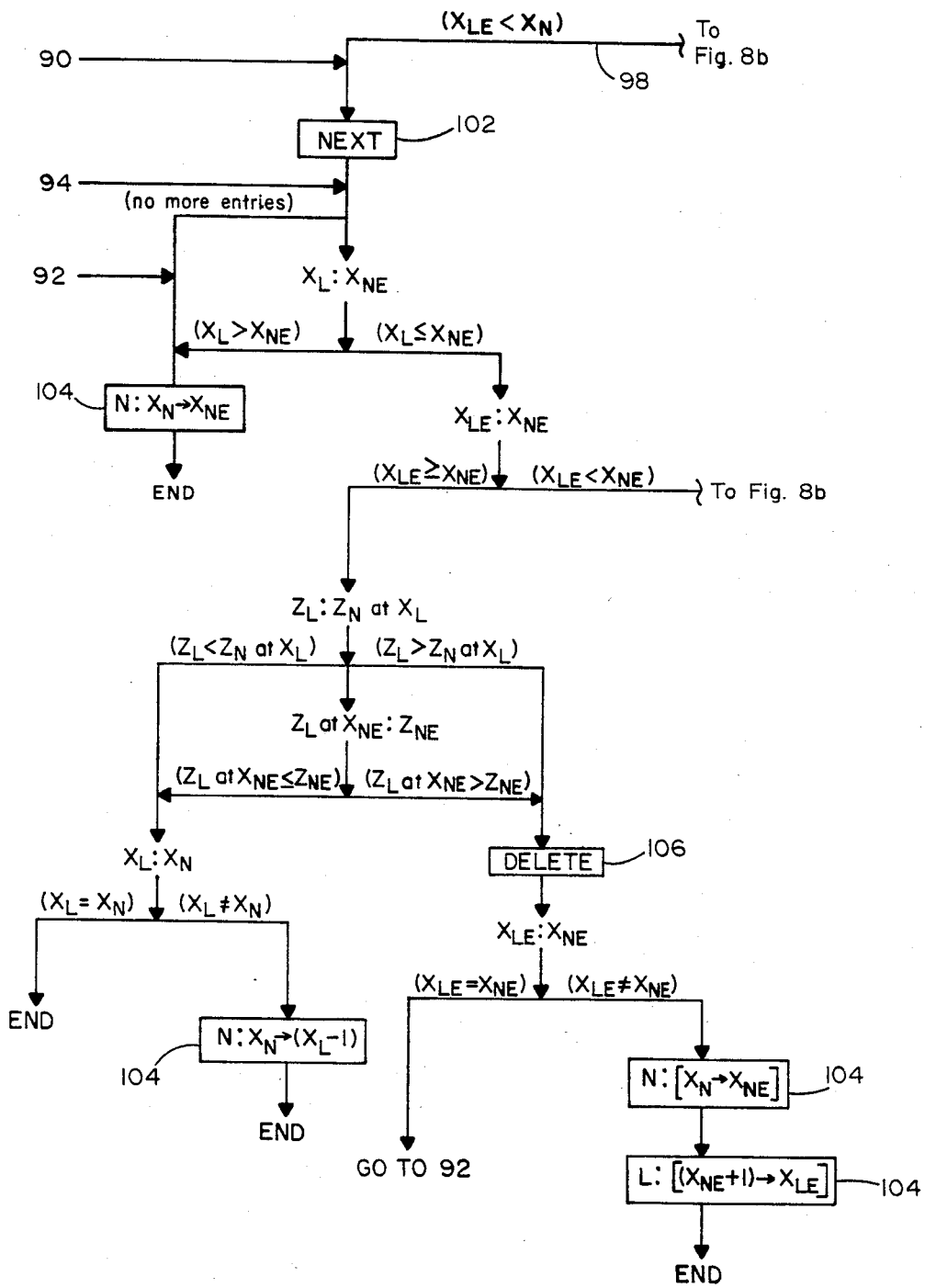
FIGS. 8a, 8b and 8c show a flow chart of the algorithm by which to control the operation of the present hidden surface processor.
Figure 8B:
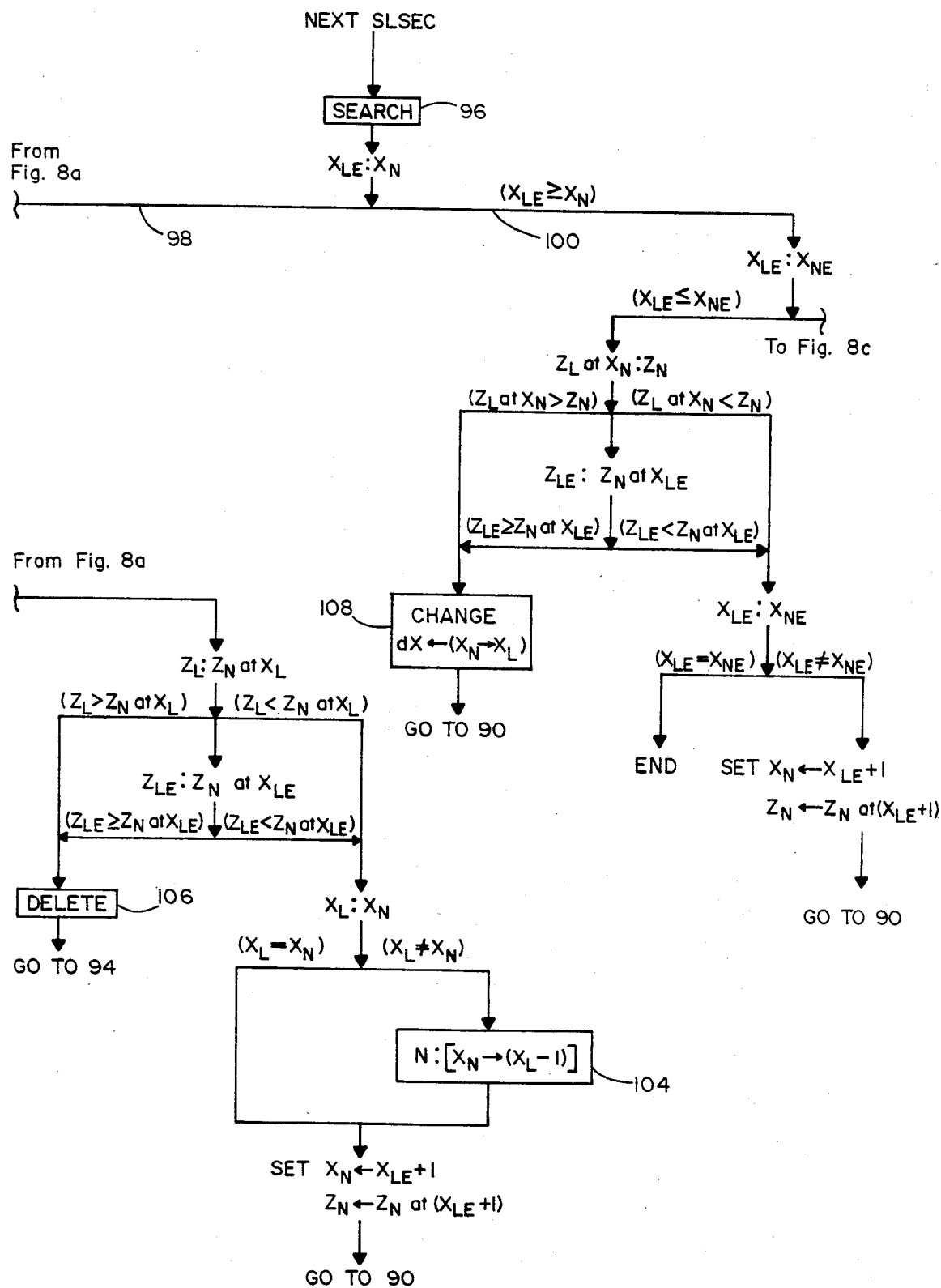
Figure 8C:
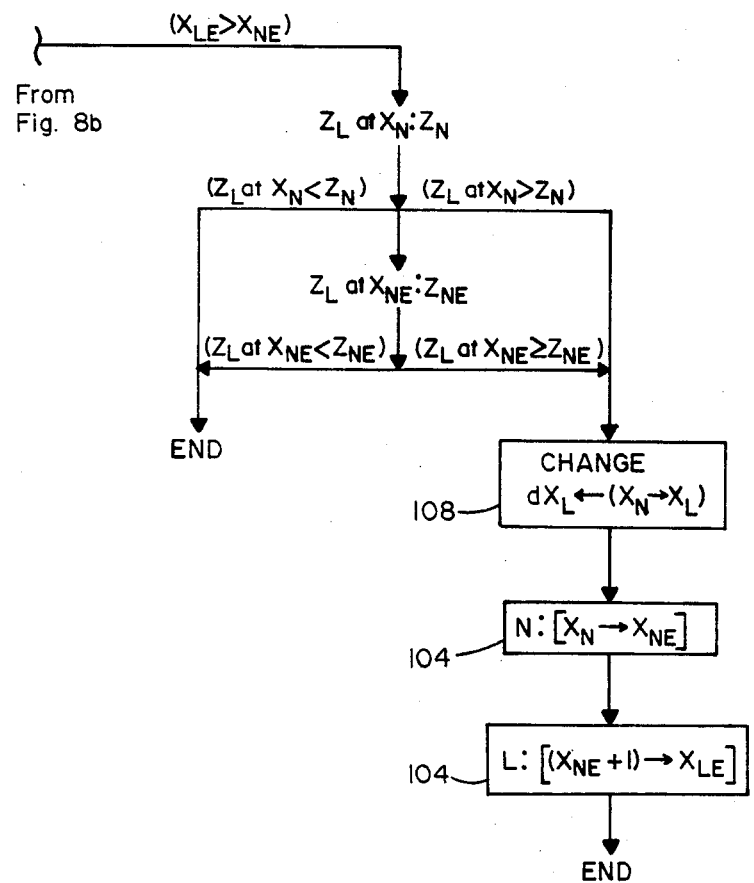

Of course, it will be recognized that other examples could have been provided by which to describe the operation of the present hidden surface processor in distinguishing visible from hidden scan line surfaces relative to the viewpoint. Each possible example, including those shown in FIGS. 2-4, is represented by a hidden surface algorithm, a flow chart of which is illustrated in FIGS. 8a, 8b and 8c. The first example of FIG. 2 is illustrated in FIG. 8b; the second example of FIG. 3 is illustrated in FIG. 8c; and the third example of FIG. 4 is illustrated in FIG. 8a. The hidden surface algorithm of FIGS. 8a-8c can be implemented in conventional microcode to control the operation of the processing logic and memory (best shown in FIGS. 6 and 7) of the present hidden surface processor.

Although an understanding by those skilled in the art of the various paths and instructions of the flow chart of FIGS. 8a-8c will be apparent from the drawings, certain details thereof will be described. Those parameters in the flow chart designated by "L" are related to an existing scan line segment already stored in the linked list. Those parameters in the flow chart designated by "N" are related to a new scan line segment, some, all, or none of which will be added to the linked list. Before any path of the flow chart is entered, a search of the linked list, designated by instruction 96, is conducted by the aforementioned linked list search processor to locate, as previously disclosed, the scan line segment having the largest starting coordinate $X_L$, such that $X_N > X_L$, where $X_N$ is the starting coordinate of the new scan line segment having information to be possibly inserted into the linked list. Once such an existing scan line segment is returned, a comparison is made between the magnitude of the ending coordinate, $X_{LE}$, of the existing scan line segment with the starting coordinate, $X_N$, of the new scan line segment.

Depending upon the results of such comparison, one or the other of the two branches 98 or 100 of the illustrated flow chart is entered. In the event that $X_{LE} < X_N$, branch 98 is entered. In such a case (as in the example of FIG. 4), and as identified by instruction 102, the next entry stored in the linked list after the existing scan line segment is returned by the linked list search processor and compared to the new scan line segment. Moreover, the completion of certain paths of the flow chart will cause an entry into branch 98 and a jump to instruction 102. In such a case (as in the example of FIG. 2), branch 98 is entered at instruction 90. What is more, the completion of certain other paths of the flow chart will also cause an entry into branch 98 and a jump to instructions 92 or 94.

As was indicated in the examples of FIGS. 2-4, some or all of a scan line segment may be added to the linked list. Such a transfer of information is represented by an instruction 104. Likewise, some or all of a scan line segment may be deleted from the linked list. Such deletion is represented by an instruction 106. Moreover, the coordinates of certain items in the linked list may be changed, so that such item may be added to the linked list at a corresponding new address. Such a change of information in the list is represented by instruction 108.

Figure 5:
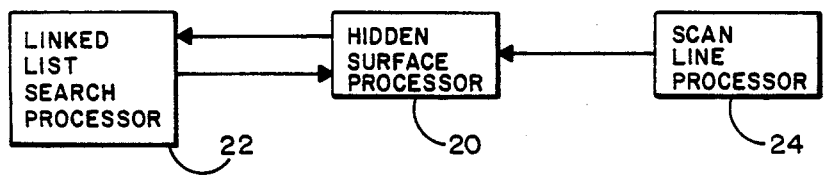
FIG. 5 is illustrative of a sub-system of a computer graphics system comprising the present hidden surface processor interconnected with a linked list search processor and a scan line processor.

Referring to FIG. 5 of the drawings, the hidden surface processor 20 of the present invention is shown diagrammatically interconnected with the hereinabove described linked list search processor 22 and a scan line processor 24. Hidden surface processor 20, search processor 22, and scan line processor 24 form a subsystem of a computer graphics system. As previously indicated, information regarding a visible scan line segment is selectively inserted into a linked list of existing scan line data depending upon the scan line segment starting coordinate $X_N$. Scan line processor 24 is implemented in a substantially identical fashion to the soon-to-be disclosed hidden surface processor 20. Scan line processor 24 processes one complete scan line at a time and supplies input information to the hidden surface processor 20 which is indicative of the particular portions of polygons to which each scan line corresponds.

Figure 6:
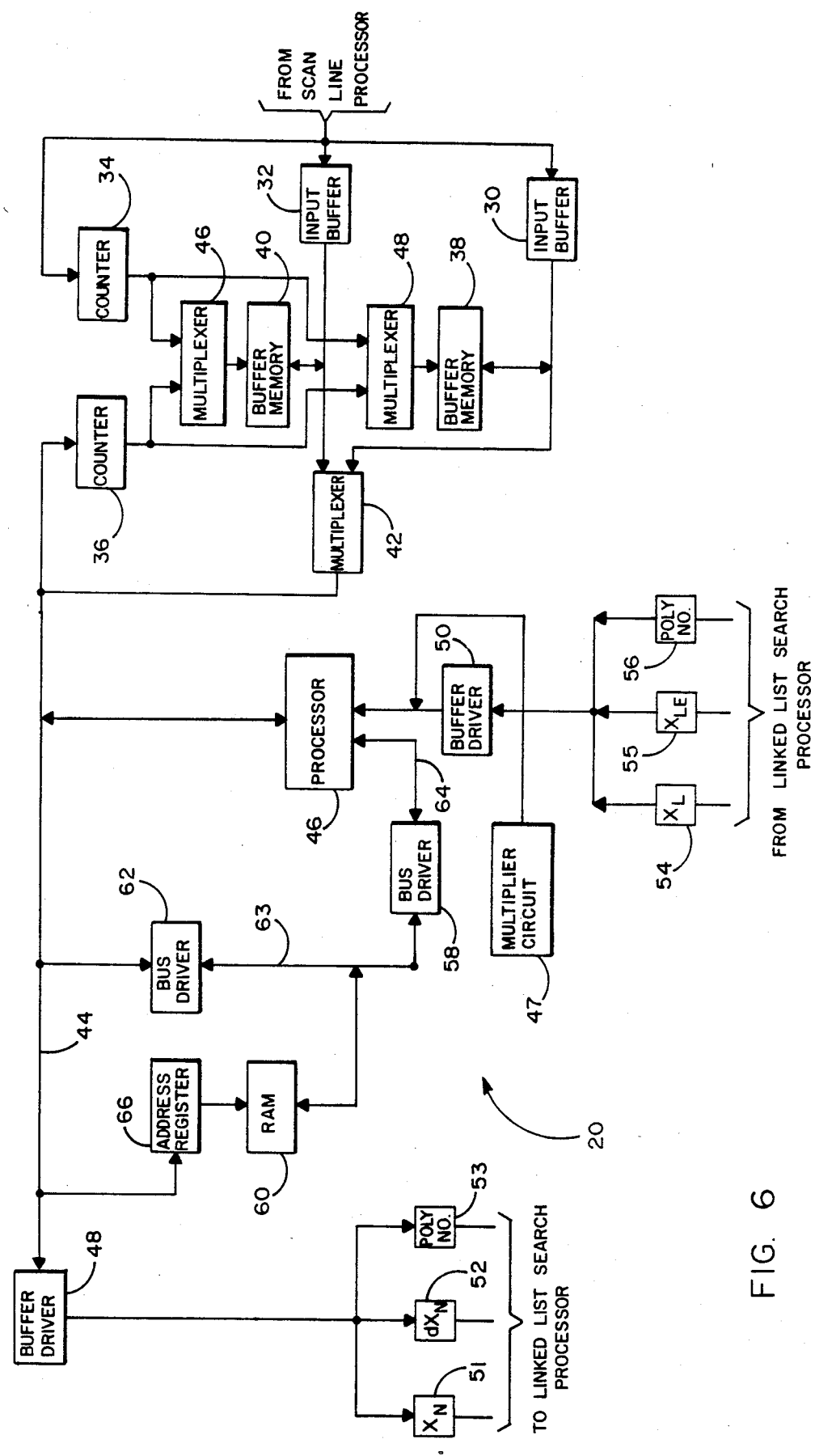
FIG. 6 is a block diagram of the central processing unit and memory which forms the present hidden surface processor.

The central processing unit and memory of the hidden surface processor 20 of the present invention is described in detail while referring to FIG. 6 of the drawings. Output signals from the aforementioned scan line processor are supplied to each of a pair of input buffers 30 and 32 and to one buffer counter 34 of a pair thereof. The output signals contain information regarding a new scan line segment to be added to the linked list, such information including $X_N$, $dX_N$, $dZdX_N$, $Z_N$ and a particular polygon number to which a new scan line segment corresponds. Each of input buffers 30 and 32 is preferably implemented from three 74F244 microelectronic chips cascaded together. Input buffers 30 and 32 are interconnected with respective buffer memories 38 and 40 and a multiplexer 42. Only one of input buffers 30 or 32 is enabled at any particular time so that information can be read into or written by a corresponding one buffer memory 38 or 40. Each buffer memory 38 or 40 is a 4K×24 RAM and is preferably implemented from six 1420 microelectronic chips cascaded together (to form a 24 bit buffer memory). As will be apparent to those skilled in the art, buffer memories 38 and 40 are arranged in a conventional double-buffered configuration. Multiplexer 42 is preferably implemented from six 74F257 microelectronic chips cascaded together. Multiplexer 42 selects the particular ones of the two input buffers 30 or 32 and buffer memories 38 or 40 which will be enabled for reading (or writing) data. The output of multiplexer 42 is supplied to a data bus line 44 and to the other one 36 of the pair of buffer counters. Counters 34 and 36 are preferably implemented from three 74F191 microelectronic chips cascaded together. Counters 34 and 36 are interconnected with each of buffer memories 38 and 40 by way of a respective multiplexer 46 and 48. Each multiplexer 46 and 48 is preferably implemented from six 74F257 microelectronic chips cascaded together. Counters 34 and 36 and multiplexers 46 and 48 interact to access a particular address in respective buffer memories 38 and 40 and to concurrently cause one of the memories 38 or 40 to read data and the other of the memories to write data.

Interconnected with data bus 44 is a multiple pipe line processor 46. Processor 46 is preferably implemented by three 29501 microelectronic chips cascaded together. Inasmuch as each chip has an eight bit capacity, processor 46 is a 24 bit processor. Processor 46 is micro-programmed to perform the general arithmetical and logical operations necessary to implement the hidden surface algorithm as represented by the flow chart in FIGS. 8a-8c. Output data from processor 46 is supplied to the linked list search processor (22 of FIG. 5) by way of data bus 44 and a buffer driver 48. Input data is supplied to processor 46 from the linked list search processor via a buffer driver 50 in response to output data (i.e. search argument) provided by processor 46. As previously disclosed, certain information regarding a new scan line segment is read and provided to the linked list search processor in order that a search may be performed of the existing data entries therein. Such information, which is provided by the scan line processor and also stored in respective registers 51, 52 and 53, is indicative of the new scan line segment starting coordinate ($X_N$), the length ($dX_N$) of the new scan line segment and the number of the polygon to which the new scan line segment corresponds. Depending upon the results of the search of the contents of the linked list, corresponding information regarding an existing and previously read scan line segment is returned by the linked list search processor to processor 46. Such information, which is stored in respective registers 54, 55 and 56, is indicative of the existing scan line segment starting coordinate ($X_L$), the existing scan line segment ending coordinate ($X_{LE}$) and the number of the polygon to which the existing scan line segment corresponds. Each of registers 51–56 is preferably implemented from three 74F374 microelectronic chips cascaded together. The information transmitted between registers 51–56 and buffer drivers 48 and 50 is twelve bits in length. However, it is to be understood that the information transmitted between drivers 48 and 50 and the other processing and memory devices of hidden surface processor 20 is 24 bits in length.

Interconnected with processor 46 is multiplier circuitry 47. Multiplier circuitry 47 is preferably a 24 bit multiplier which is implemented from an AM29516 microelectronic chip. Multiplier circuitry 47 performs various multiplication computations which are necessary to determine the distance from the viewpoint of a particular pixel of a scan line segment. An equation for accomplishing the foregoing has been disclosed hereinabove. Also interconnected with processor 46 by way of a bus driver 58 is a random access memory (RAM) 60. Processor 46 interfaces with RAM 60 by way of data bus 44 and another bus driver 62. Each of bus drivers 58 and 62 is preferably implemented from three 74F245 microelectronic chips cascaded together. Bus drivers 58 and 62 either isolate the data bus lines (designated 63 and 64) which interconnect the processor 46 and RAM 60 or permit such data bus lines to communicate with one another. RAM 60 is preferably implemented from six 1420 microelectronic chips cascaded together, so as to form a 4K×24 bit memory. RAM 60 is interconnected with an address register 66, so as to be adapted to be addressed at a particular location corresponding to the starting coordinate ($X_L$) of the existing scan line segment as provided by register 54. For any given polygon segment, RAM 60 supplies information to processor 46 corresponding to the distance ($Z_L$) in the Z direction between an existing scan line segment and the viewpoint and a change in the distance of the existing scan line segment in the Z direction for a change of the scan line segment in the X direction ($dZdX_L$).

In operation, processor 46 communicates with the buffer memories 38 and 40, multiplier 47 and RAM 60, so that computations and subsequent comparisons can be achieved according to the instructions of the hidden surface algorithm flow chart of FIGS. 8a–8c. However, and before any computations are made, the initially known information regarding a new scan line segment and the previously read, existing scan line segments are stored in buffer memories 38 and 40 and RAM 60, respectively. The hidden surface algorithm controls the transfer of information within hidden surface processor 20 and between hidden surface processor 20 and the scan line processor and linked list search processor, so that high speed determinations of the hidden and visible surfaces of pluralities of scan line segments relative to a viewpoint can be efficiently accomplished.

The hidden surface processor 20 also includes diagnostic and control hardware by which to control the operation thereof, depending upon the hidden surface algorithm. Such hardware is illustrated in FIG. 7 of the drawings. More particularly, and referring concurrently to FIGS. 6 and 7, the hardware includes a writable control store 70. Writable control store 70 stores instructional words in conventional microcode necessary to implement the hidden surface algorithm. Thus, writable control store 70 acts to control the operation of processor 46 and the addressing of buffer memories 38 and 40 and RAM 60. An address register 72 is associated with writable control store 70, so as to control the loading and reading of data therein. Address register 72 is preferably implemented from a 74F374 microelectronic chip. The output of writable control store 70 is supplied to a series of (e.g. 64) control gates and to a multiplexer 74. Also connected to multiplexer 74 is conventional branch logic 76. Multiplexer 74 is preferably implemented from a pair of 74F257 microelectronic chips cascaded together. Multiplexer 74 acts to select the particular branch conditions from branch logic 76 and the next address from address register 72 whereby to control the writable control store 70. Branch logic 76 includes a plurality of well-known branch conditions which are based on current arithmetic conditions. That is, certain input test conditions are supplied to branch logic 70, so that a corresponding address can be selected from address register 72.

Writable control store 70 is connected between a diagnostic and control bus 77 and the aforementioned control gates. The control gates are interconnected with the logic and memory devices of FIG. 6 to control the operation of the hidden surface processor, depending upon the branch conditions supplied to branch logic 76 and the instructions stored in writable control store 70. Diagnostic and control bus 77 is interfaced with writable control store 70 by way of a bus driver 80, an eight bit data bus 84 and a bus driver 82. Bus driver 80 is preferably implemented from a 74F244 microelectronic chip so as to control the reading of address register 72. Bus driver 82 is preferably implemented from a 74F245 microelectronic chip. Data bus 84 is an independent input/output bus which is utilized to load the writable control store 70. Data bus 84 is interfaced with writable control store 70 by way of a data input/output driver 78. Data driver 78 is preferably implemented from a 74F245 miroelectronic chip and controls the loading and reading of data into and out of writable control store 70.

It will be apparent that while a preferred embodiment of the invention has been shown and described, various modifications and changes may be made without departing from the true spirit and scope of the invention.

Having thus set forth a preferred embodiment of the invention, what is claimed is:

1. A hidden surface processor to distinguish between the hidden and visible surfaces of a pair of video scan line segments relative to a viewpoint, one of said segments being positioned behind the other, said segments comprising one or more picture elements and forming portions of a three dimensional scene, and said hidden surface processor including:

first memory means including buffer memories to store information regarding a first scan line segment including the location thereof relative to an arbitrary set of axes, second memory means including a random access memory to store information regarding the second scan line segment including the location thereof relative to said set of axes, processor means interconnected with said first and second memory means for accessing the memories thereof and for comparing the information regarding the first and second scan line segments to determine whether the respective locations of said segments relative to one another are such that at least a portion of one of said segments is obscured by the other of said segments with respect to the viewpoint, and multiplier means interconnected with said processor means for multiplying together certain of the information stored in said first and second memory means for providing an indication of the distance from the viewpoint to a picture element which forms one of said first or second scan line segments.

2. The hidden surface processor recited in claim 1, wherein said first memory means includes a pair of buffer memories having respective input buffer means connected thereto for receiving the information regarding the first scan line segment.

3. The hidden surface processor recited in claim 2, wherein said pair of buffer memories are interconnected with one another in a double buffered configuration.

4. The hidden surface processor recited in claim 1, wherein the random access memory has address register means associated therewith for locating the information regarding the second scan line segment.

5. The hidden surface processor recited in claim 1, wherein said set of axes extends in the X and Z directions of a three dimensional coordinate system, each of said first and second scan line segments having a length in the X direction and being spaced from the viewpoint by a distance in the Z direction, said scan line segments being positioned behind one another in the Z direction.

6. The hidden surface processor recited in claim 5, wherein the information stored in said first memory means includes the starting coordinate in the X direction of said first scan line segment.

7. The hidden surface processor recited in claim 5, wherein the information stored in said first memory means includes the length in the X direction of said first scan line segment.

8. The hidden surface processor recited in claim 5, wherein the information stored in said first memory means includes an indication of the amount of change in the distance from the viewpoint of said first scan line segment in the Z direction for any picture element along the length of said first segment in the X direction.

9. The hidden surface processor recited in claim 5, wherein the information stored in said first memory means includes the distance from the viewpoint in the Z direction of the first picture element of said first scan line segment.

10. The hidden surface processor recited in claim 5, wherein the information stored in said second memory means includes the distance from the viewpoint in the Z direction to the first picture element of said second scan line segment.

11. The hidden surface processor recited in claim 5, wherein the information stored in said second memory means includes an indication of the amount of change in the distance from the viewpoint to said second scan line segment in the Z direction at any picture element along the length of said second segment in the X direction.

12. The hidden surface processor recited in claim 5, wherein said multiplier means performs the calculation:

$$Z_o + (\Delta X) \cdot (\Delta ZX);$$

where $Z_o$ is the distance from the viewpoint in the Z direction of the first picture element of the one of said scan line segments, $\Delta X$ is the distance in the X direction between the respective starting coordinates of said pair of scan line segments, and $\Delta ZX$ is an indication of the amount of change in distance from the viewpoint of said one scan line segment in the Z direction for any picture element along the length of said segment in the X direction.

13. The hidden surface processor recited in claim 12, wherein said processor means compares the magnitude of the calculation computed by said multiplier means regarding the one of said scan line segments with the distance from the viewpoint in the Z direction of the first picture element of the other of said scan line segments so as to determine which of said scan line segments is closer to the viewpoint in the Z direction.

14. The hidden surface processor recited in claim 1, wherein said hidden surface processor is interfaced with a linked list processor, said linked list processor having a list of scan line segments stored therein, said linked list processor providing the second of said scan line segments having a starting coordinate $X_L$ in response to the first scan line segment having a starting coordinate $X_N$, where $X_L$ is the largest starting coordinate of any scan line segment stored in the list thereof, such that $X_N > X_L$.

15. In a computer graphics system for projecting on a video display a two dimensional image of a three dimensional scene, said computer graphics system having information stored therein corresponding to a list of previously read video scan line segments to represent one or more polygons which form the three dimensional scene, a hidden surface processor to receive information corresponding to a new video scan line segment so that information corresponding to said new segment can be added to the list of previous scan line segments, said hidden surface processor distinguishing between the hidden and visible surfaces of a selected one of said previously read segments and said new segment relative to a viewpoint, each of said previous and new segments being arranged in the X and Z directions of a three dimensional coordinate system and having a length in the X direction and being spaced from the viewpoint by a distance in the Z direction, said existing and new scan line segments being positioned behind one another in the Z direction, said hidden surface processor including:

first register means to receive and store an indication of the starting and ending coordinates in the X direction of said previously read scan line segment, second register means to receive and store an indication of the starting and ending coordinates in the X direction of said new scan line segment, computing means for receiving information regarding the positions of said previous and new scan line segments relative to the viewpoint in the Z direction and calculating the distance from said viewpoint to each of said previous and new segments at the same coordinate therealong in the X direction, and processor means interconnected with each of said first and second register means and said computing means for receiving therefrom and comparing relative to one another both the starting and ending coordinates of said previous and new scan line segments and the distances from said viewpoint to the same coordinate along each of said previous and new scan line segments so as to determine whether one of said scan line segments is obscured by the other of said scan line segments with respect to the viewpoint.

16. The computer graphics system and hidden surface processor recited in claim 15, wherein said computer graphics system includes a linked list processor for storing an ordered list of the information corresponding to said previous scan line segments, said linked list processor interconnected with said hidden surface processor by way of said first register means.

17. The computer graphics system and hidden surface processor recited in claim 16, wherein said hidden surface processor includes third register means to also receive and store indications of said starting and ending coordinates in the X direction of said new scan line segment, said third register means supplying said indications to said linked list processor, and said linked list processor returning to said hidden surface means by way of said first register means an indication of the starting coordinate of the selected one of said existing scan line segments from the ordered list of information, which selected scan line segment has the largest starting coordinate ($X_L$) in the X direction of any segment in the list, such that $X_N > X_L$, where $X_N$ is the starting coordinate in the X direction of the new scan line segment to be added to the ordered list.

18. The computer graphics system and hidden surface processor recited in claim 15, wherein said second register means includes a pair of buffer memories connected in a double buffered configuration.

19. The computer graphics system and hidden surface processor recited in claim 15, including additional register means to receive and store representations of the distance in the Z direction from the viewpoint to the first picture element of said new scan line segment and the change in the Z direction of the distance from the viewpoint to said new scan line segment at any picture element along the length of said new segment in the X direction, said additional register means interconnected with said processor means.

20. The computer graphics system and hidden surface processor recited in claim 19, wherein said additional register means includes a random access memory.

* * * * *